United States Patent
Tan

(10) Patent No.: US 8,341,698 B2
(45) Date of Patent: Dec. 25, 2012

(54) TRANSFORMING STATIC PASSWORD SYSTEMS TO BECOME 2-FACTOR AUTHENTICATION

(75) Inventor: Teik Guan Tan, Singapore (SG)

(73) Assignee: Data Security Systems Solutions Pte Ltd, Singapore (SG)

( * ) Notice: Subject to any disclaimer, the term of this patent is extended or adjusted under 35 U.S.C. 154(b) by 265 days.

(21) Appl. No.: 12/699,888

(22) Filed: Feb. 4, 2010

(65) Prior Publication Data

US 2010/0199336 A1 Aug. 5, 2010

Related U.S. Application Data

(60) Provisional application No. 61/149,710, filed on Feb. 4, 2009.

(51) Int. Cl.
*H04L 9/32* (2006.01)

(52) U.S. Cl. .................................... 726/2; 726/3; 726/9
(58) Field of Classification Search .............. 726/2–7, 726/9, 17–21; 713/168–171, 182–186
See application file for complete search history.

(56) References Cited

U.S. PATENT DOCUMENTS

| | | | |
|---|---|---|---|
| 8,127,143 B2* | 2/2012 | Abdallah et al. | 713/186 |
| 8,132,243 B2* | 3/2012 | Bychkov | 726/9 |
| 2005/0228993 A1* | 10/2005 | Silvester et al. | 713/168 |
| 2005/0268107 A1* | 12/2005 | Harris et al. | 713/182 |

* cited by examiner

*Primary Examiner* — Hosuk Song
(74) *Attorney, Agent, or Firm* — Pyprus Pte Ltd

(57) ABSTRACT

The present invention provides systems and processes for transforming any system that implements a static password authentication or $1^{st}$-factor authentication so as to enforce strong 2-factor authentication, requiring the user to present both a static password and a dynamic password, without having to modify the existing system.

20 Claims, 6 Drawing Sheets

US 8,341,698 B2

TRANSFORMING STATIC PASSWORD SYSTEMS TO BECOME 2-FACTOR AUTHENTICATION

CROSS-REFERENCE TO RELATED APPLICATIONS

The present application claims the benefit of US Provisional application entitled "Transforming Static Password Systems To Become Strong 2-Factor Authentication" filed Feb. 4, 2009 having Ser. No. 61/149,710.

FIELD OF THE INVENTION

The present invention relates to two-factors authentication, in particular, the present invention relates to a system and method for implementing two-factor authentication on a static password system.

BACKGROUND OF THE INVENTION

In the modern electronic world, the accepted means of achieving identification are largely based on pre-determined factors, such as "something you know" (such as password, PIN number, etc.), "something you have" (such as token, access card, etc.) or "something you are" (such as fingerprint, iris scan and etc.). The validation process validating the factors is commonly known as authentication. For example, if Alice and Bob were to go on a date, they can identify each other by: i) knowing the time and place to meet ($1^{st}$ factor authentication); ii) identifying the license plates of the cars they are driving ($2^{nd}$ factor authentication); and iii) recognizing each others' faces and voices upon greeting ($3^{rd}$ factor authentication). Naturally such authentication process would not be carried out done deliberately and rigorously, but subconsciously, every time they meet. Nevertheless, if Bob forgot the time to meet but still drove the same car, Alice would not be as suspicious as if Bob were driving a different car, or worse still if Bob looked different.

The combination of different authentication factors makes for a stronger possibility that the person being identified is accurately authenticated. For example, if a system requires only the user to present a secret password (one factor authentication) to be identified, while another system requires the user to present both a secret password and dynamic password generated from a unique token (Two-factor authentication or 2FA), the latter system shall be taken as a more secure system in authenticating users. There had been many successful attacks, such as phishing and pharming against systems implementing only one-factor authentication to ascertain the identity of the users, and such attacks are set to grown.

Even so, systems that running on the one-factor authentication are far outstrips systems that implement 2FA. 2FA are most commonly adapted by financial institution or the like. There are a myriad of reasons that one-factor authentication is more preferred over the 2FA. The reasons include cost feasibility, system feasibility, protocol compatibility and user controllability.

Many 2FA solutions, such as RSA, VASCO, DS3 and etc, are already exist commercially. It can be integrated at their backend systems to achieve 2-factor authentication for their users. Integrating 2FA solutions requires major upgrades or the existing systems. Accordingly, the cost of deploying and maintaining 2FA across the existing systems may outweigh the benefits derived. It becomes a main factor that dissuading organizations from such implementations.

While organizations strive to keep their application systems open and up-to-date, there would inevitably be some legacy applications or proprietary systems which are beyond the control of the organization to modify or re-configure. Even if the organization has an enterprise-wide 2FA solution in place, such systems will not be able to make use of the added security.

There are a number of password protocols that are incompatible with the use of 2FA. Kerberos, for example, that are widely used by many systems including Microsoft Windows Active Directory, the enterprise backbone of majority of the systems in the world is not compatible with 2FA. During the user login phase, the Kerberos Network Authentication protocol requires to manipulate the static password as part of key-exchange with the Kerberos server. The protocol does not work well with 2FA solutions when the user has to provide a static password and a dynamic password for transmitting to the backend authentication server.

There are a number of workarounds available which involve modifying the Windows GINA login process to separately handle the dynamic password, but these workarounds are cumbersome to deploy and even more difficult to maintain.

So far, the implementations of 2FA are left to the prerogative of the system owner. If the system owner chooses not to implement 2FA to protect the user accounts, there is no much the user can do besides choosing more complicated passwords and using only trusted machines to login.

This is very apparent on the Internet where majority of Internet and Web 2.0 services such as Gail, MSN, Yahoo, Facebook, MapleStory, etc. do not offer 2FA despite high demand from users. Users who want 2FA to protect their accounts are simply at the mercy of the system owners.

SUMMARY OF THE INVENTION

The present invention provides systems and processes for transforming any system that implements a static password authentication or 1st-factor authentication so as to enforce strong 2-factor authentication, requiring the user to present both a static password and a dynamic password, without having to modify the existing system.

In one aspect of the present invention, there is provided a system for implementing 2-factors authentication or multi-factors authentication on a existing system that implements a static password authentication or 1-factor authentication. The system comprises a token manager operable to track users' token and generate a second authentication factor; a password manager accessible to the existing system, the password manager is operable to form a new authentication code based on a first authentication factor the second authentication factor, wherein the first authentication factor is an authenticated code registered on the existing system for accessing thereto, the password manager replaces the first authentication factor with the new authentication code currently registered on the existing system.

In one embodiment, the generation the second authentication factor and replacement of the first authentication factor with the new authentication code are executed recursively at a pre-defined interval.

In another embodiment, the token manager generates the second authentication factor based on a first authentication factor. In a further embodiment, the first authentication factor may comprise a static password and the second authentication factor comprises a dynamic password.

In yet another embodiment, the password manager replaces the first authentication factor with the new authentication code via a change password operation. It is also possible that the password manager replaces the first authentication factor with the new authentication code via a set/reset password operation.

In a further embodiment, the system is resided remotely from the existing system. It is also possible that the system is resided on the existing system. Yet, the token manager may reside remotely from the existing system when the password manager may reside on the existing system.

In yet a further embodiment, the system may be a software module or a hardware module, or combination of both.

In accordance with another aspect of the present invention, there is provided a method of implementing 2-factors authentication or multi-factors authentication on a existing system that implements a static password authentication or I-factor authentication. The method comprises deploying a module; tracking for users' token through the existing system; generating a second authentication factor; forming a new authentication code based on a first authentication factor and the second authentication factor, wherein the first authentication factor is an authenticated code registered on the existing system for accessing thereto; replacing the first authentication factor with the new authentication code on the existing system, thereby authentication to access the existing system will be based on the new authentication code.

In one embodiment, generating the second authentication factor and replacing the authenticated code with the new authentication code are executed recursively at a pre-determined interval.

In one embodiment, the first authentication factor comprises a static password and the second authentication factor comprises a dynamic password. It is possible that the second authentication factor is generated based on the first authentication factor.

In another embodiment, replacing the first authentication factor with the new authentication code comprises changing a registered password on the existing system. It is also possible that replacing the first authentication factor with the new authentication code comprising setting/resetting a registered password on the existing system.

In a further embodiment, the module is deployed to reside remotely from the existing system. It is also possible that the module is deployed to reside on the existing system.

Yet, the module may be a software module or a hardware module or combination of both.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

Figure 1:
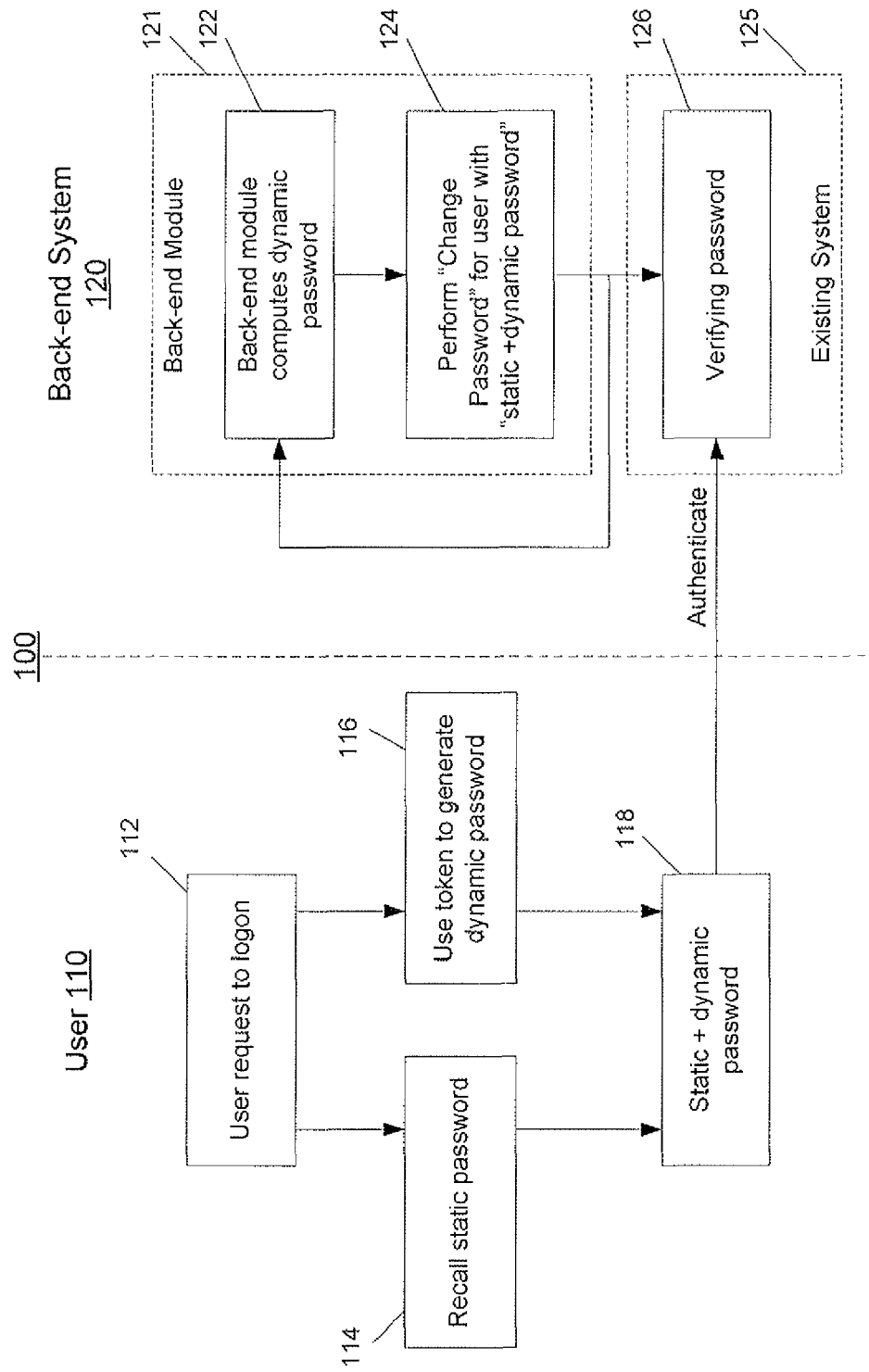
FIG. 1 is a block functional diagram of the 2-factor authentication system in accordance with one embodiment of the present invention.

In line with the above summary, the following description of a number of specific and alternative embodiments is provided to understand the inventive features of the present invention. It shall be apparent to one skilled in the art, however that this invention may be practiced without such specific details. Some of the details may not be described at length so as not to obscure the invention. For ease of reference, common reference numerals will be used throughout the figures when referring to the same or similar features common to the figures.

It is an object of the present invention to provide a solution implementable on an established system, typically a one-factor authentication system, to support two-factor authentication (2FA). It is desired that the implementation of 2FA on an established one-factor authentication system does require any modification on the existing system. The present invention provides systems and methods for transforming the existing system implementing a static password authentication or $1^{st}$-factor authentication into a 2FA system. In one embodiment, the transformed system would require users to present a static password and a dynamic password for authentication, without having to modify the existing system.

For the purpose of this description, the static password referred to a predefined code or string of characters used for authentication. The static password is a first authentication factor commonly stored at the existing system to be accessed. The static password is generally fixed for at all time until it is being changed by user's request. The dynamic password, on the other hand, refer to a second authentication factor that is generated based on a prescribed algorithm.

FIG. 1 is a functional diagram of a 2FA system 100 in accordance with one embodiment of the present invention. The 2FA system 100 comprises generally two parties: a front-end user 110 and a back-end system 120. For simplicity, the frond-end user 110 shall also refer to as the user 110, and the back-end system 120 shall also refer to as the back-end system 120. The user or front-end user 110 is hereinafter referred to as any persons giving a legitimate right to access a restricted access resource with an identification code. The back-end system 120 includes a back-end module 121 and an existing system 125. The back-end module 121 is able to access existing system 125, and can be provided insource or outsource to the existing system 125. The existing system 125 is a one-factor or static password authentication system. Prior to the login process, the user 110 is given a token for acquiring a user dynamic password.

The token may be in a form of a hardware device, software module running on a device, a message transmitted via any available means such as SMS, email and etc., or even a scratch card or any physical media containing a sequence of passwords. Typically, the dynamic password provided through the token is a One Time Password (OTP), that are pseudo-random number changes at pre-determined intervals or any predetermined conditions. These conditions may be specific to the user at the specific time or interval. A person skill in the art would appreciate that the token are widely used for 2FA or multi-factors authentication, and thus details are not provided herewith for simplicity.

Operationally, on the back-end system's 120 side, on a regular pre-set interval, the back-end module 121 computes a dynamic password at step 122. Once the dynamic password is generated, the back-end module performs a "Change Password" operation to change a currently registered password registered on the existing system 125 to a new password comprises a static password and the modular dynamic password at a pre-defined form at step 124. The Change Password operation is a typical feature allowing users to change the registered password voluntarily on any one-factor authentication system. At step 126, the new password is being registered on the existing system 126 awaiting next user's login. The new password is further recorded at the back-end module, so that the subsequence new password can be obtained based on the previously obtained new password. With the regularly changing and updating of the new password that comprises the static password and the dynamic password on the existing system 125, the existing system 125 can be better protected, as the password registered on the existing system 125 comprises two or more authorizations factors.

The user's 110 static password is a recorded password registered at the existing system 125. The user 110 supposedly to use the static password to access the existing system 125 that based on the one-factor authorization. The static password should also pre-recorded with the back-end module 121 for generating the new password. In case when the user 110 changes the static password voluntarily, the back-end module 121 needs to be updated with the new static password.

The pre-defined form of the new password may be any combinations of both the static password and the dynamic password, for example, in a concatenated form. For improve security, the new password may further be encoded.

On the user's 110 side, the user 110 requests to logon to the existing system 125 at step 112. The user 110 then recalls a static password for the user 110 to access the existing system 125 at the step 114 and acquires a dynamic password through the token at step 116. Once the static password and the dynamic password are available to the user 110 at step 118, the two passwords are combined and provided to the existing system 125 at a predefined manner, for example, concatenated, to verify against the new password recorded on the existing system 125.

The dynamic password obtained through the token shall be the same or corresponded to the dynamic password generated by the back-end module 121. Similarly, the predefined manner of the combined password from the user 110 shall also be the same or corresponded to the new password registered on the existing system 125. Accordingly, the combined password transmitted from the user's 110 side is verified against the new password registered at the existing system 125 for authentication. It is to be noted that the verification and authentication of the passwords are done at the existing system 125 via the one-factor or static password authentication. Accordingly, the 2FA is implemented on the existing system 125 through the back-end module 121 and thereby significantly improve the security of the existing system 125.

The back-end module 121 is an add-on application or system that works independently from the one-factor authentication system adapted on the existing system 125. It automatically includes a second factor or more factors into the one-factor authentication system without the need to modify the existing system 125. There is also no change and modification to the protocol adapted by the existing system 125.

In one embodiment, the static password is stored at the back-end module 121 so that the static password is retrievable for concatenating with the second (or more) factor for authentication.

It is understood to a skilled person that the present invention is applicable in most, if not all, existing systems adapting one-factor authorization. There is provided a module, which can be deployed on the existing systems to expand the authorization to two or more factors authorization, thereby increases the security of access. Typically, users access the system via electronic means, such as personal computer, mobile phones, etc, over a communication network, such as Internet.

Figure 2:
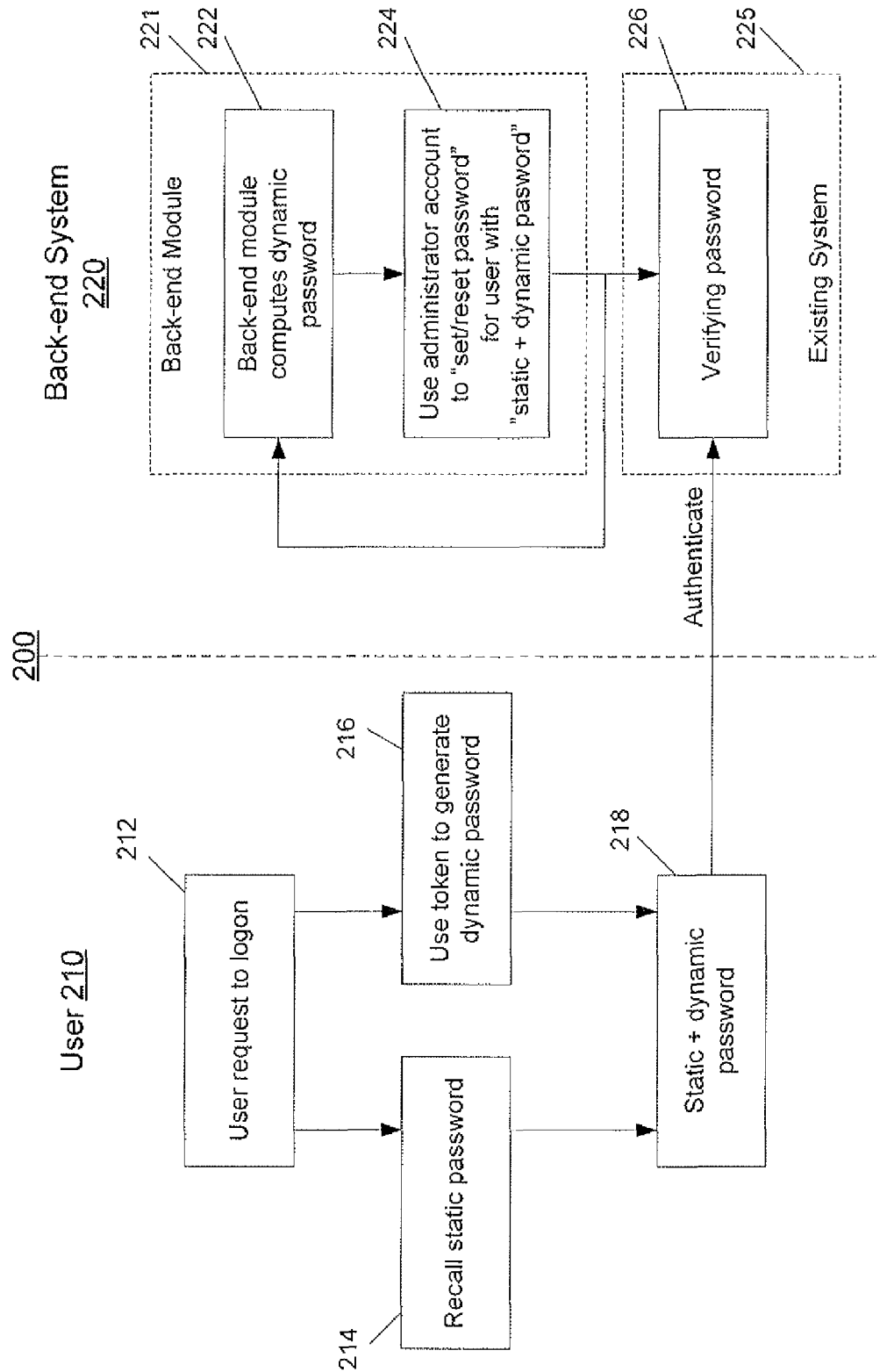
FIG. 2 is a block functional diagram of the 2-factor authentication system in accordance with another embodiment of the present invention.

FIG. 2 is a functional diagram of a 2FA system 200 in accordance with another embodiment of the present invention. The 2FA system 200 comprises a user 210 and a back-end system 220. The back-end system 220 comprises a back-end module 221 and an existing system 225. Operationally, at a regular pre-set interval, the back-end module 221 computes a dynamic password at step 222. The dynamic password is then concatenated with a registered static password for form a new password. At step 224, the new password is being set/reset as the authorized password for accessing the existing system 225. Generally, such operation (i.e. set/reset the password) requires administrator privileges to set the new password, which differs from the "Change Password" operation illustrated in the FIG. 1. Accordingly, at step 226, the concatenated password transmitted from the user 210 is verified against the new password set by the back-end module 221 for authentication.

One the user's 210 side, the user 210 is given a token. At step 212, the user 210 request to logon to the existing system 225. At step 214, the user 210 recalls a static password and at step 216, the user activates the token to generate a dynamic password. At step 218, a new password comprising the static password and the dynamic password can be formed and provided to the existing system 225. Accordingly, the existing system 225 may verify the new password from the user 210 against the concatenated password current registered on the existing system 225.

It is understood to the skilled person that the back-end module 221 is provided to alter and update the recorded password registered on the existing system 225 to a new password that comprises the original static password and the generated password. The aforementioned embodiments achieve a 2FA on an existing one-factor authentication system by altering the password registered on the existing system 225 to include a second-factor (i.e. the dynamic password) for authentication, thereby simulate a 2FA on the one-factor authentication system.

For the purpose of this description, the operations "Change Password" and "Set/Reset Password" differ mainly with the privileges to access the existing system 225. As mentioned, in most of the systems, general users are given a user right to change their password voluntarily. To execute the change password operation, the user would require to input the password currently registered on the existing system 225. On the other hand, the set/reset password operation is generally operable by the administrator of the existing system 225, thereby required the administrator privileges to perform such operation. Under the administrator privileges, typically, the passwords registered on the existing system 225 can be changed without knowing what the passwords. Hence, it is important to recognize that implementation of the 2FA on a one-factor authentication system would require regular replacement of the registered passwords with those that include a second authentication factor thereto. Accordingly, the 2FA or multi-factor authentication can be implemented on any existing system without any major upgrade or modification on the system and/or protocols adapted thereto.

Figure 3:
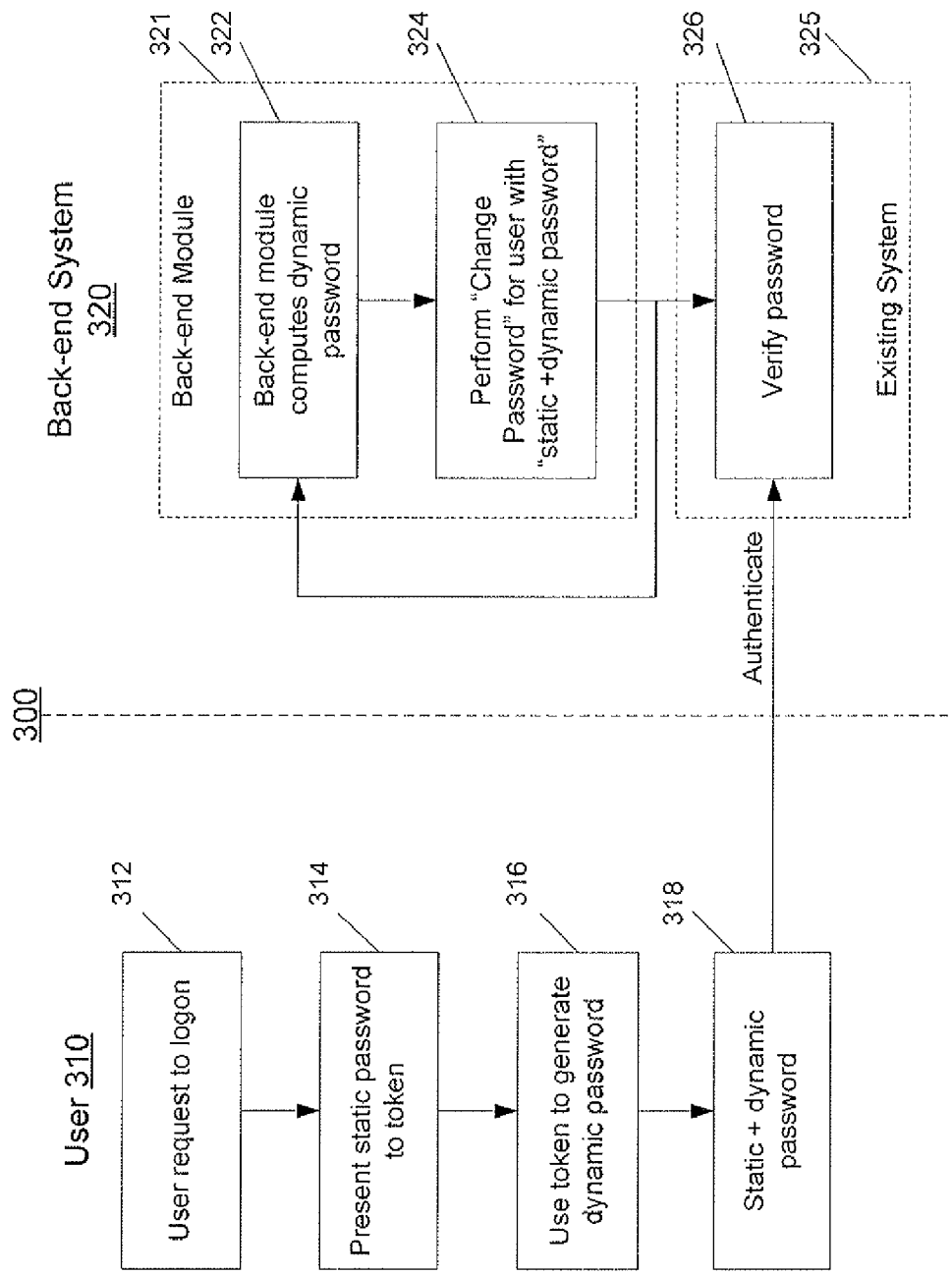
FIG. 3 is a block functional diagram of the 2-factor authentication system in accordance with another embodiment of the present invention.

FIG. 3 is a functional diagram of a 2FA system 300 in accordance with yet another embodiment of the present invention. The 2FA system 300 comprises a user 310 and a back-end system 320. The back-end system 320 comprises a back-end module 321 and an existing system 325. Operationally, at a regular pre-set interval, the back-end module 321 resided on the back-end system 320 compute a dynamic password at step 322. At step 324, the back-end module 321 performs a "Change Password" operation to change a current password on record to the dynamic password generated by the back-end module 321 by providing the current password on record. Consequently, the existing system 325 awaits user 310 to logon with the dynamic password. Similarly, the operations that generate the dynamic password and changing the password on record are carried out recursively at a pre-defined period/interval.

On the user's 310 side, the user 310 is given a token. At step 312, the user 310 requests to login to the existing system 325. At step 314, the user 310 input a static password to the token. At step 316, the token provides a dynamic password. The dynamic password is then provided to the back-end system 320 at step 318 for authentication. The access to the existing system 325 is allowed to the user 310 who has provided a matched dynamic password.

Referring back to the step 322, the back-end module may compute the dynamic password based on a static password registered on the back-end system 320. It is also possible that the back-end module compute the dynamic password without any static password as long as the user ID is verified. In this case, the input of the static password to the token can be taken as a first authentication factor, whilst the dynamic password is taken as a second authentication factor.

In this embodiment, although only the dynamic password is used for authentication at the existing system 325, another authentication factor is required in order to generate the dynamic password, therefore, the 2FA is also realized.

Figure 4:
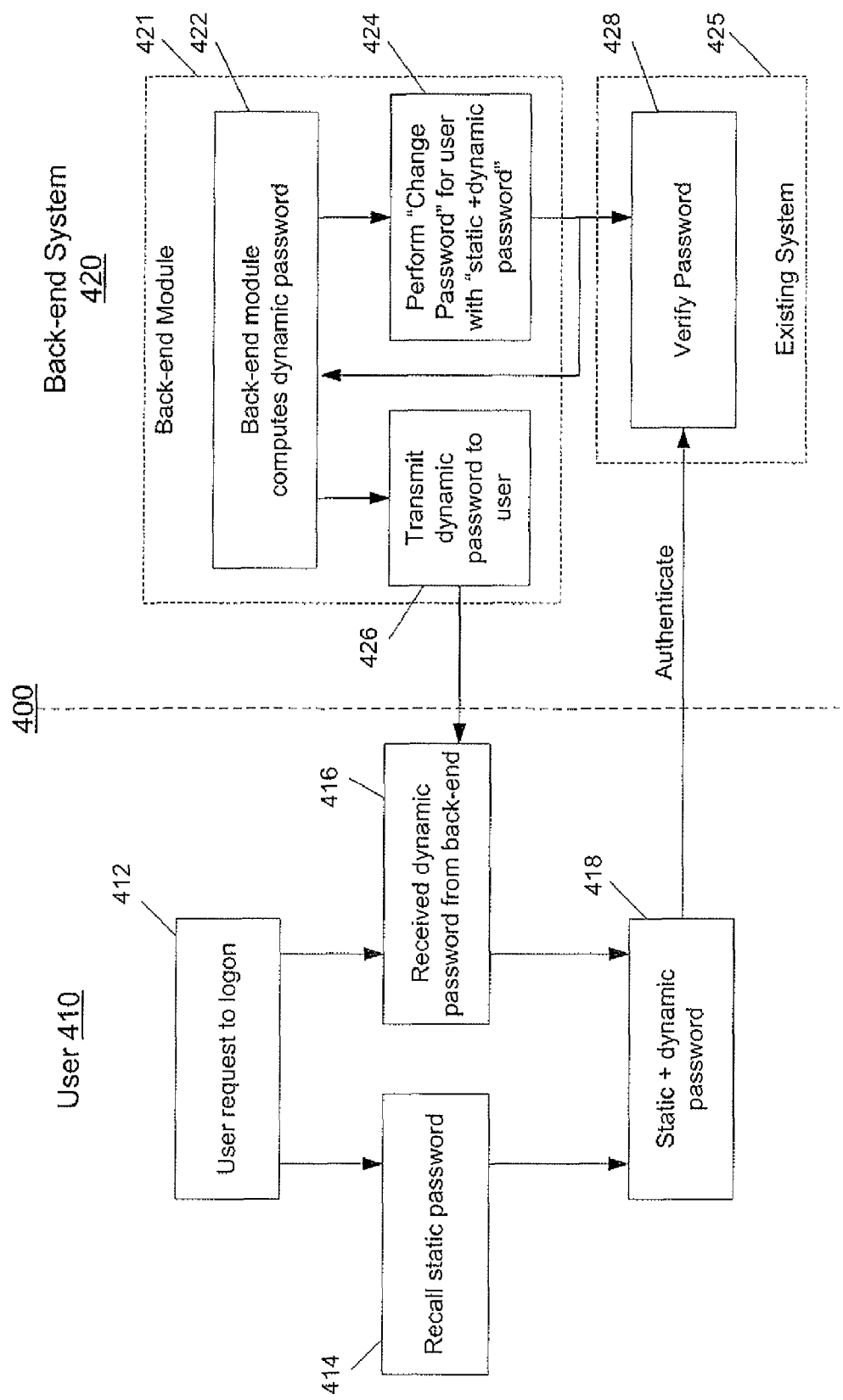
FIG. 4 is a block functional diagram of the 2-factor authentication system in accordance with another embodiment of the present invention.

FIG. 4 is a functional diagram of a 2FA system 400 in accordance with yet another embodiment of the present invention. The 2FA system 400 comprises a user 310 and a back-end system 420. The back-end system 420 also comprises a back-end module 421 and an existing system 425. Operationally, at a regular pre-set interval, the back-end module 421 computes the dynamic password at step 422. At step 424, a "Change Password" operation is carried out by the back-end module 421 to change the existing password to the concatenated password at step 424. At step 426 that occur after the dynamic password is generated (the step 422), the dynamic password is transmitted to the user 410 remotely as required. Consequently, the existing system 425 awaits user 410 to logon.

On the user's 410 side, the user has a pre-registered means in the form of a mobile phone number or email address or any online messaging system to receive the dynamic password. The dynamic password is provided to the user 410 remotely when the dynamic password was transmitted at step 426. The user 410 is able to obtain the dynamic password via any available means, for example, the generated dynamic password may be transmitted from the back-end module 421 via SMS or email or online messaging to the user 410. The user 410 receives the dynamic password from the back-end module 421 at the step 416 at the point of time when the password on the existing system 425 is changed. To login, the user 410 recalls a static password previously registered with the existing system 425 at step 414 and concatenates with the dynamic password received at step 418. The concatenated password is then provided to the existing system 421 for authentication at step 428.

As shown in the above embodiments, the HA or multi-factors authorization can be implemented on a one factor authorization or static password authorization system via deploying a module without the need for modifying or changing the existing infrastructure and protocol of the existing system. The module comprises a token manager and a password manager. The token manager is provided for tracking users' token and generating a corresponding dynamic password. The token manager is adapted to ensure that the dynamic passwords generated are up-to-date and in-synchronization. The password manager is adapted retrieve and replaces an existing password to a new password when authentication is required. The password replacement can be carried out via a change password operation or a set/reset password operation. Depending on the type of deployment, the password manager may require storing/restoring the original passwords. The type of deployment can either be a local deployment or remote deployment.

Figure 5:
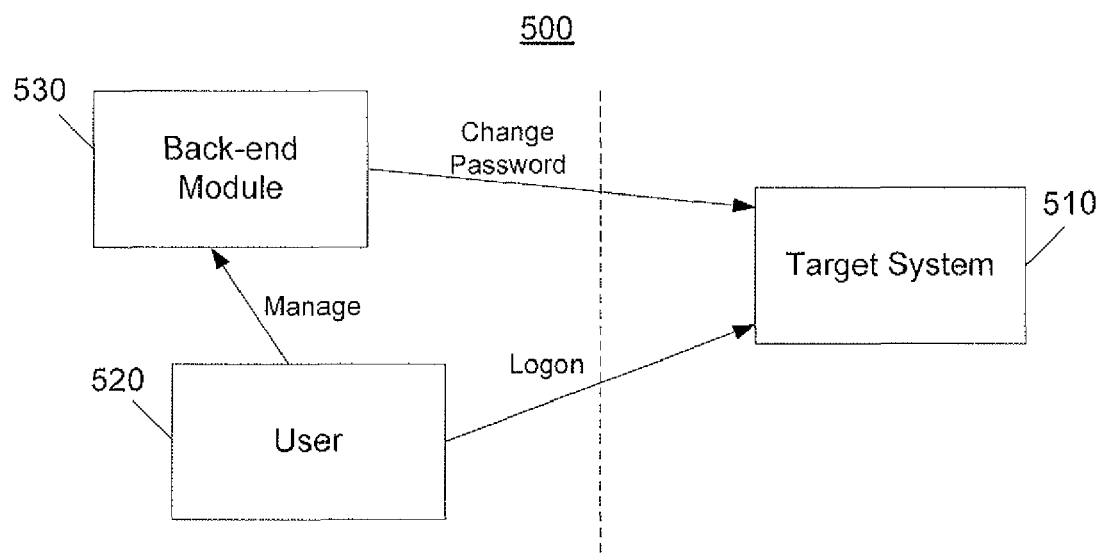
FIG. 5 is a block functional diagram of the 2-factor authentication system in accordance with another embodiment of the present invention.

FIG. 5 illustrates a block diagram of a 2FA deployment 500 in accordance with one embodiment of the present invention. The 2FA deployment 500 is implemented on a target system 510 that allows users 520 to access thereto. The target system 510 is a system adapting a static password or one-factor authorization. A back-end module 530 is deployed at a remote system accessible to the target system 510 for implementing and simulating 2FA. The remote system can be an external service provider for implementing the 2FA system. The back-end module 530 is adapted to implement the 2FA via a "Change Password" operation. In this case, users may manage their own dynamic tokens by accessing the remote system directly through a token management service provided thereon. This embodiment is desirable for system hosted on the Internet and Web 2.0, such as GMail.

Figure 6:
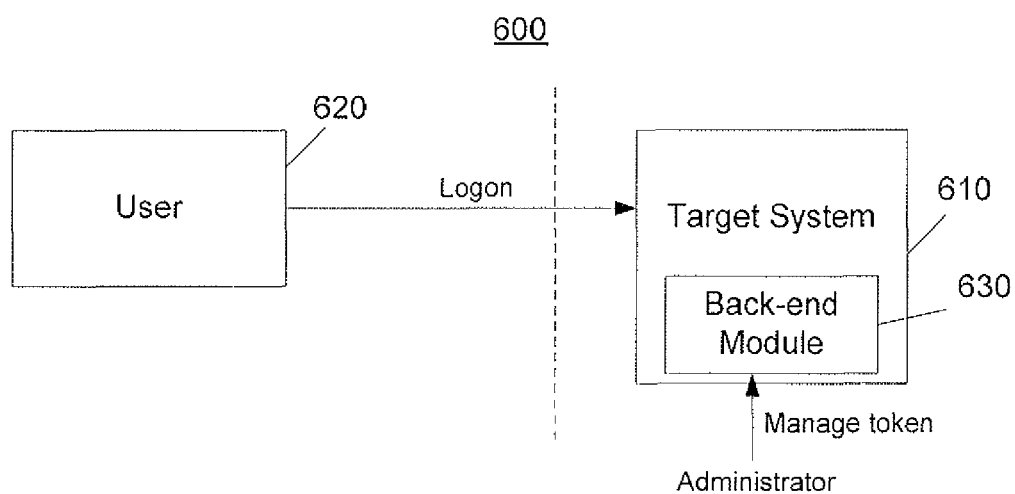
FIG. 6 is a block functional diagram of the 2-factor authentication system in accordance with another embodiment of the present invention.

FIG. 6 illustrates a block diagram of a 2FA deployment 600 in accordance with an alternative embodiment of the present invention. The 2FA deployment 600 is implemented on a target system 610 that allows users 620 to access thereto in a similar matter as the 2FA deployment 500 of FIG. 5 except that a backend-module 630 of the 2FA deployment 600 is integrated on the target system 610. The integrated 2FA deployment 600 is better in performance and less processing overheads. The 2FA deployment 600 is suitable, through not limited for an enterprise that has full control over the target system 610 itself, for example, Microsoft Windows Active Directory. Token management of the like for the user will likely to be dependable on the administrator.

Figure 7:
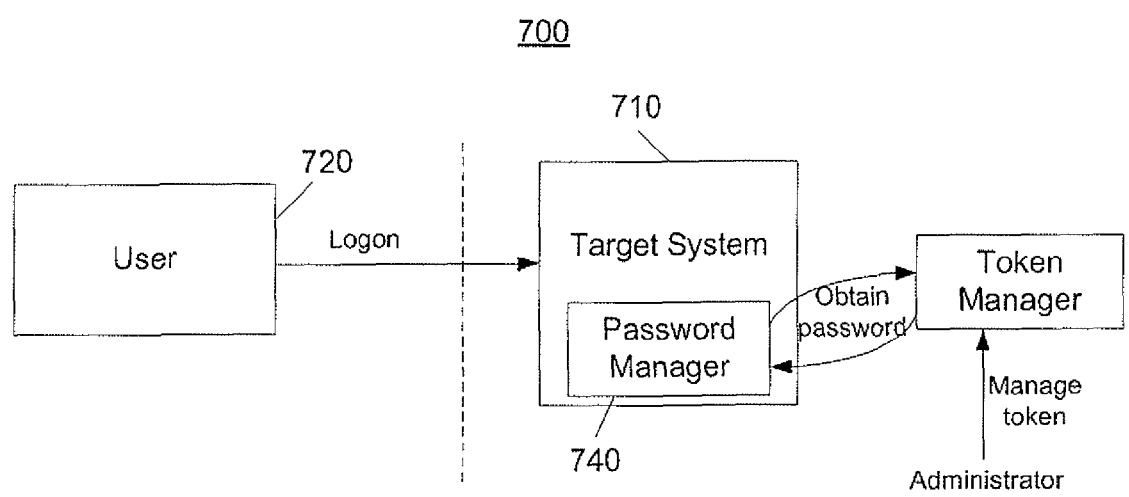
FIG. 7 is a block functional diagram of the 2-factor authentication system in accordance with another embodiment of the present invention.

In yet a further embodiment of the present invention, there is provided a 2FA deployment 700 as shown in FIG. 7. The 2FA deployment 700 is implemented on a target system 710 by having a password manager 740 of a back-end module integrated locally, but a token manager 730 of the back-end module resides remotely, or externally. When users 720 requests to login, the password manager 740 is operable to connect to the token manager to obtain the updated password for the user 720. A new password will be generated to authenticating the user 720. Similarly, the password manager 40 may carry out a "Change Password" to replace the current registered password to the new password for authentication. This deployment 700 is suitable for enterprises having multiple target systems that require to implement 2-factor authentication thereto.

A variation of the add-on module would be to site the Token Management outside the target system, while keeping the Change Password component within the target system. At regular intervals, the Change Password component will connect to the Token Management service to obtain the updated passwords for the users, and to set the passwords for the users. Such setups are suitable for enterprises where there are multiple target systems.

The present invention is suitable for transforming a one-factor authentication system into a 2FA system. It is however understood to a skilled person that the present invention is able to turn any existing system (including a established 2FA system) into a multi-factor authentication system, with no or minor modification on any of the above embodiments.

While specific embodiments have been described and illustrated, it is understood that many changes, modifications, variations and combinations thereof could be made to the present invention without departing from the scope of the invention.

What is claimed is:

1. An apparatus deployed with a module for implementing 2-factors authentication or multi-factors authentication on an existing remote system that adapts a static password authentication or 1-factor authentication without the need to modify and change an existing authentication infrastructure of the existing remote system, the apparatus comprising:
    a token manager operable to track users' token and generate a second authentication factor;
    a password manager accessible to the existing remote system, the password manager is operable to form a new authentication code based on a first authentication factor and the second authentication factor, wherein the first authentication factor is an authenticated code registered on the existing remote system for accessing thereto, the password manager replaces the first authentication factor with the new authentication code currently registered on the existing remote system.

2. The apparatus according to claim 1, wherein generation the second authentication factor and replacement of the first authentication factor with the new authentication code are executed recursively at a pre-defined interval.

3. The apparatus according to claim 1, wherein the new authentication code comprises the first authentication factor and the second authentication factor.

4. The apparatus according to claim 1, wherein the token manager generates the second authentication factor based on a first authentication factor.

5. The apparatus according to claim 1, wherein the first authentication factor comprises a static password and the second authentication factor comprises a dynamic password.

6. The apparatus according to claim 1, wherein the password manager replaces the first authentication factor with the new authentication code via a change password operation.

7. The apparatus according to claim 1, wherein the password manager replaces the first authentication factor with the new authentication code via a set/reset password operation.

8. The apparatus according to claim 1, wherein the module is resided remotely from the existing remote system.

9. The apparatus according to claim 1, wherein the module is resided on the existing remote system.

10. The apparatus according to claim 1, wherein the token manager is resided remotely from the existing remote system and the password manager is resided on the existing remote system.

11. The apparatus according to claim 1, wherein the module is a software module.

12. The apparatus according to claim 1, wherein the module is a hardware module.

13. A method operationally carrying out on an apparatus for implementing 2-factors authentication or multi-factors authentication on an existing remote system that adapts a static password authentication or 1-factor authentication, the method comprising:
    deploying a module;
    tracking for users' token through the existing remote system;
    generating a second authentication factor;
    forming a new authentication code based on a first authentication factor and the second authentication factor, wherein the first authentication factor is an authenticated code registered on the existing remote system for accessing thereto;
    replacing the first authentication factor with the new authentication code on the existing remote system through a password change or reset operation,
    thereby authentication to access the existing remote system will be based on the new authentication code when the users are required to input only the first authentication factor.

14. The method according to claim 13, wherein generating the second authentication factor and replacing the authenticated code with the new authentication code are executed recursively at a pre-determined interval.

15. The method according to claim 13, wherein the first authentication factor comprises a static password and the second authentication factor comprises a dynamic password.

16. The method according to claim 13, wherein the second authentication factor is generated based on the first authentication factor.

17. The method according to claim 13, wherein replacing the first authentication factor with the new authentication code comprises changing a registered password on the existing remote system.

18. The method according to claim 13, wherein replacing the first authentication factor with the new authentication code comprising setting/resetting a registered password on the existing remote system.

19. The method according to claim 13, wherein the module is deployed to reside remotely from the existing remote system.

20. The method according to claim 13, wherein the module is deployed to reside on the existing remote system.

* * * * *